United States Patent
Kujak et al.

(10) Patent No.: US 10,543,737 B2
(45) Date of Patent: Jan. 28, 2020

(54) CASCADE HEAT TRANSFER SYSTEM

(71) Applicant: THERMO KING CORPORATION, Minneapolis, MN (US)

(72) Inventors: Stephen A. Kujak, Onalasaka, WI (US); Kenneth J. Schultz, Onalaska, WI (US); Jeffrey B. Berge, Eden Prairie, MN (US); Panayu Robert Srichai, Minneapolis, MN (US); Vladimir Sulc, Minnetonka, MN (US); Michal Kolda, Prague (CZ); John R. Sauls, La Crosse, WI (US)

(73) Assignee: Thermo King Corporation, Minneapolis, MN (US)

( * ) Notice: Subject to any disclaimer, the term of this patent is extended or adjusted under 35 U.S.C. 154(b) by 65 days.

(21) Appl. No.: 15/392,581

(22) Filed: Dec. 28, 2016

(65) Prior Publication Data

US 2017/0182869 A1 Jun. 29, 2017

Related U.S. Application Data

(60) Provisional application No. 62/271,872, filed on Dec. 28, 2015.

(51) Int. Cl.
*F25B 7/00* (2006.01)
*B60H 1/32* (2006.01)

(52) U.S. Cl.
CPC ........... *B60H 1/323* (2013.01); *B60H 1/3226* (2013.01); *B60H 2001/3289* (2013.01)

(58) Field of Classification Search
CPC .... B60P 3/20; F25B 7/00; F25B 9/008; F25D 29/003; F25D 11/003; B60H 1/3208;
(Continued)

(56) References Cited

U.S. PATENT DOCUMENTS

| 4,116,017 A | 9/1978 | Oberpiller |
| 4,165,037 A * | 8/1979 | McCarson ............. F24F 3/001 237/1 R |

(Continued)

FOREIGN PATENT DOCUMENTS

| DE | 102014200160 | 7/2015 |
| EP | 2131122 | 12/2009 |

(Continued)

OTHER PUBLICATIONS

Bansal; "Thermodynamic analysis of an R744-R717 cascade refrigeration system"; Department of Mechanical Engineering, International Journal of Refrigeration, 2008, vol. 31, pp. 45-54.

(Continued)

*Primary Examiner* — Henry T Crenshaw
*Assistant Examiner* — Kamran Tavakoldavani
(74) *Attorney, Agent, or Firm* — Hamre, Schumann, Mueller & Larson, P.C.

(57) ABSTRACT

A transport refrigeration system (TRS) includes a first heat transfer circuit including a first compressor, a condenser, a first expansion device, and a cascade heat exchanger. The first compressor, the condenser, the first expansion device, and the cascade heat exchanger are in fluid communication such that a first heat transfer fluid can flow therethrough. The TRS includes a second heat transfer circuit including a second compressor, the cascade heat exchanger, a second expansion device, and an evaporator. The second compressor, the cascade heat exchanger, the second expansion device, and the evaporator are in fluid communication such that a second heat transfer fluid can flow therethrough. The first heat transfer circuit and the second heat transfer circuit are arranged in thermal communication at the cascade heat exchanger such that the first heat transfer fluid and the
(Continued)

second heat transfer fluid are in a heat exchange relationship at the cascade heat exchanger.

20 Claims, 6 Drawing Sheets

(58) Field of Classification Search
CPC ............... B60H 1/323; B60H 1/3226; B60H 2001/00949; B60H 2001/00928; B60H 1/32284; B60H 1/3232
See application file for complete search history.

(56) References Cited

U.S. PATENT DOCUMENTS

| | | | |
|---|---|---|---|
| 4,201,063 A | 5/1980 | Martinez, Jr. | |
| 4,748,820 A | 6/1988 | Shaw | |
| 5,245,836 A | 9/1993 | Lorentzen et al. | |
| 5,440,894 A | 8/1995 | Schaeffer et al. | |
| 5,497,631 A | 3/1996 | Lorentzen et al. | |
| 5,692,387 A | 12/1997 | Alsenz et al. | |
| 6,092,379 A | 7/2000 | Nishida et al. | |
| 6,298,674 B1 | 10/2001 | Finkenberger | |
| 6,381,972 B1 | 5/2002 | Cotter | |
| 6,385,980 B1 | 5/2002 | Sienel | |
| 6,418,732 B1 | 7/2002 | Klane et al. | |
| 6,418,735 B1 | 7/2002 | Sienel | |
| 6,457,325 B1 | 10/2002 | Vetter | |
| 6,523,360 B2 | 2/2003 | Watanabe et al. | |
| 6,568,199 B1 | 5/2003 | Manohar et al. | |
| 6,585,494 B1 | 7/2003 | Suzuki | |
| 6,606,867 B1 | 8/2003 | Sienel | |
| 6,629,488 B2 | 10/2003 | Hugelman | |
| 6,647,742 B1 | 11/2003 | Neiter et al. | |
| 6,658,888 B2 | 12/2003 | Manohar et al. | |
| 6,679,320 B2 | 1/2004 | Stefan | |
| 6,694,763 B2 | 2/2004 | Howard | |
| 6,698,214 B2 | 3/2004 | Chordia | |
| 6,698,234 B2 | 3/2004 | Gopalnarayanan et al. | |
| 6,739,141 B1 | 5/2004 | Sienel et al. | |
| 6,813,895 B2 | 11/2004 | Eisenhower et al. | |
| 6,817,193 B2 | 11/2004 | Caesar et al. | |
| 6,898,941 B2 | 5/2005 | Sienel | |
| 6,923,011 B2 | 8/2005 | Manole | |
| 6,925,821 B2 | 8/2005 | Sienel | |
| 6,968,708 B2 | 11/2005 | Gopalnarayanan et al. | |
| 7,000,413 B2 | 2/2006 | Chen et al. | |
| 7,010,925 B2 | 3/2006 | Sienel et al. | |
| 7,024,883 B2 | 4/2006 | Sienel et al. | |
| 7,028,494 B2 | 4/2006 | Pondicq-Cassou et al. | |
| 7,051,542 B2 | 5/2006 | Chen et al. | |
| 7,051,551 B2 | 5/2006 | Matsumoto et al. | |
| 7,526,924 B2 * | 5/2009 | Wakamoto | F25B 7/00 62/175 |
| 7,878,023 B2 | 2/2011 | Heinbokel | |
| 7,891,201 B1 | 2/2011 | Bush et al. | |
| 7,992,408 B2 | 8/2011 | Bush et al. | |
| 7,997,092 B2 | 8/2011 | Lifson et al. | |
| 8,113,008 B2 | 2/2012 | Heinbokel et al. | |
| 8,186,171 B2 | 5/2012 | Heinbokel | |
| 8,312,737 B2 | 11/2012 | Bush et al. | |
| 8,316,654 B2 | 11/2012 | Heinbokel et al. | |
| 8,322,150 B2 | 12/2012 | Mitra et al. | |
| 8,359,489 B2 | 1/2013 | Shen et al. | |
| 8,359,491 B1 | 1/2013 | Bloomstein | |
| 8,359,873 B2 | 1/2013 | Lifson et al. | |
| 8,375,741 B2 | 2/2013 | Taras et al. | |
| 8,381,538 B2 | 2/2013 | Lifson et al. | |
| 8,418,482 B2 | 4/2013 | Bush et al. | |
| 8,424,326 B2 | 4/2013 | Mitra et al. | |
| 8,424,337 B2 | 4/2013 | Scarcella et al. | |
| 8,459,052 B2 | 6/2013 | Bush et al. | |
| 8,528,359 B2 | 9/2013 | Lifson et al. | |
| 8,561,425 B2 | 10/2013 | Mitra et al. | |
| 2001/0023594 A1 | 9/2001 | Ives | |
| 2005/0044885 A1 | 3/2005 | Pearson | |
| 2006/0080988 A1 | 4/2006 | Zhang et al. | |
| 2006/0124275 A1 * | 6/2006 | Gosse | B60H 1/00421 165/42 |
| 2008/0011007 A1 * | 1/2008 | Larson | B60H 1/00428 62/323.2 |
| 2008/0256975 A1 | 10/2008 | Lifson et al. | |
| 2009/0241566 A1 | 10/2009 | Bush et al. | |
| 2010/0050668 A1 | 3/2010 | Bush et al. | |
| 2010/0071391 A1 | 3/2010 | Lifson et al. | |
| 2010/0077777 A1 | 4/2010 | Lifson et al. | |
| 2010/0095690 A1 | 4/2010 | Bush et al. | |
| 2010/0095700 A1 | 4/2010 | Bush et al. | |
| 2010/0115975 A1 | 5/2010 | Mitra et al. | |
| 2010/0132399 A1 | 6/2010 | Mitra et al. | |
| 2010/0199712 A1 | 8/2010 | Lifson et al. | |
| 2010/0251756 A1 | 10/2010 | Scarcella et al. | |
| 2010/0269523 A1 | 10/2010 | Asprovski et al. | |
| 2010/0271221 A1 | 10/2010 | Asprovski et al. | |
| 2010/0281894 A1 | 11/2010 | Huff | |
| 2010/0326100 A1 | 12/2010 | Taras et al. | |
| 2011/0023514 A1 * | 2/2011 | Mitra | F25B 1/10 62/222 |
| 2011/0030399 A1 * | 2/2011 | Lifson | B60H 1/00385 62/115 |
| 2011/0041523 A1 | 2/2011 | Taras et al. | |
| 2011/0048041 A1 | 3/2011 | Asprovski et al. | |
| 2011/0048042 A1 | 3/2011 | Chen et al. | |
| 2011/0100040 A1 | 5/2011 | Bush et al. | |
| 2011/0132007 A1 | 6/2011 | Weyna et al. | |
| 2011/0138825 A1 | 6/2011 | Chen et al. | |
| 2011/0162396 A1 | 7/2011 | Chen et al. | |
| 2011/0174014 A1 | 7/2011 | Scarcella et al. | |
| 2011/0209490 A1 | 9/2011 | Mijanovic et al. | |
| 2011/0239668 A1 | 10/2011 | Qiao et al. | |
| 2011/0280750 A1 | 11/2011 | Flanigan | |
| 2011/0314863 A1 | 12/2011 | Mitra et al. | |
| 2012/0011866 A1 | 1/2012 | Scarcella et al. | |
| 2012/0174605 A1 | 7/2012 | Huff et al. | |
| 2012/0192579 A1 | 8/2012 | Huff et al. | |
| 2012/0198868 A1 | 8/2012 | Huff et al. | |
| 2012/0291461 A1 | 11/2012 | Verma et al. | |
| 2012/0318006 A1 | 12/2012 | Liu et al. | |
| 2012/0318008 A1 | 12/2012 | Liu et al. | |
| 2012/0318014 A1 | 12/2012 | Huff et al. | |
| 2013/0031929 A1 | 2/2013 | Flanigan | |
| 2013/0031934 A1 | 2/2013 | Huff et al. | |
| 2013/0111935 A1 | 5/2013 | Zou et al. | |
| 2013/0111944 A1 | 5/2013 | Wang et al. | |
| 2013/0125569 A1 | 5/2013 | Verma et al. | |
| 2013/0145781 A1 | 6/2013 | Liu | |

FOREIGN PATENT DOCUMENTS

| | | |
|---|---|---|
| EP | 2924372 | 9/2015 |
| WO | 2014082069 | 5/2014 |
| WO | 2014199445 | 2/2017 |

OTHER PUBLICATIONS

European Search Report issued in corresponding European Application No. 16207174.0 dated Apr. 28, 2017 (9 pages).

Kim G. Christensen: "The World's first McDonald's restaurant using natural refrigerants"; Danish Technological Institute, Refrigeration science and technology, 2004, pp. 1-9.

Techline: "An exchange of technical information about carrier transicold container products"; NaturaLINE Unit, Jun. 2013, vol. 19, No. 1, pp. 1-6.

* cited by examiner

CASCADE HEAT TRANSFER SYSTEM

FIELD

This disclosure relates generally to a transport refrigeration system (TRS). More specifically, the disclosure relates to systems and methods for providing a cascade heat exchange between a plurality of heat transfer circuits in a TRS.

BACKGROUND

A transport refrigeration system (TRS) is generally used to control one or more environmental conditions such as, but not limited to, temperature, humidity, and/or air quality of a transport unit. Examples of transport units include, but are not limited to, a container (e.g., a container on a flat car, an intermodal container, etc.), a truck, a boxcar, or other similar transport units. A refrigerated transport unit is commonly used to transport perishable items such as produce, frozen foods, and meat products. Generally, the refrigerated transport unit includes a transport unit and a TRS. The TRS includes a transport refrigeration unit (TRU) that is attached to the transport unit to control one or more environmental conditions (e.g., temperature, humidity, etc.) of a particular space (e.g., a cargo space, a passenger space, etc.) (generally referred to as a "conditioned space"). The TRU can include, without limitation, a compressor, a condenser, an expansion device, an evaporator, and one or more fans or blowers to control the heat exchange between the air inside the conditioned space and the ambient air outside of the refrigerated transport unit.

SUMMARY

This disclosure relates generally to a transport refrigeration system (TRS). More specifically, the disclosure relates to systems and methods for providing a cascade heat exchange between a plurality of heat transfer circuits in a TRS.

In an embodiment, the TRS includes a first heat transfer circuit and a second heat transfer circuit in thermal communication. In an embodiment the first heat transfer circuit includes a relatively low global warming potential (GWP) heat transfer fluid and the second heat transfer circuit includes a heat transfer fluid that is carbon dioxide ($CO_2$, also referred to as R-744).

In an embodiment, a heat transfer fluid having a relatively low GWP includes, but is not limited to, unsaturated hydrofluorocarbons (HFCs) such as hydrofluoroolefins (HFOs), hydrocarbons (HCs), ammonia, and carbon dioxide (R-744).

A transport refrigeration system (TRS) is described. The TRS includes a first heat transfer circuit including a first compressor, a condenser, a first expansion device, and a cascade heat exchanger. The first compressor, the condenser, the first expansion device, and the cascade heat exchanger are in fluid communication such that a first heat transfer fluid can flow therethrough. The TRS includes a second heat transfer circuit including a second compressor, the cascade heat exchanger, a second expansion device, and an evaporator. The second compressor, the cascade heat exchanger, the second expansion device, and the evaporator are in fluid communication such that a second heat transfer fluid can flow therethrough. The first heat transfer circuit and the second heat transfer circuit are arranged in thermal communication at the cascade heat exchanger such that the first heat transfer fluid and the second heat transfer fluid are in a heat exchange relationship at the cascade heat exchanger.

A system is also disclosed. The system includes an internal combustion engine; a first heat transfer circuit, and a second heat transfer circuit. The first heat transfer circuit includes a first compressor, a condenser, a first expansion device, and a cascade heat exchanger, wherein the first compressor, the condenser, the first expansion device, and the cascade heat exchanger are in fluid communication such that a first heat transfer fluid can flow therethrough. The second heat transfer circuit includes a second compressor, the cascade heat exchanger, a second expansion device, and an evaporator, wherein the second compressor, the cascade heat exchanger, the second expansion device, and the evaporator are in fluid communication such that a second heat transfer fluid can flow therethrough. The first heat transfer circuit and the second heat transfer circuit are arranged in thermal communication at the cascade heat exchanger such that the first heat transfer fluid and the second heat transfer fluid are in a heat exchange relationship at the cascade heat exchanger.

A method of heat transfer in a transport refrigeration system (TRS) is also disclosed. The method includes providing a first heat transfer circuit including a first compressor, a condenser, a first expansion device, and a cascade heat exchanger, wherein the first compressor, the condenser, the first expansion device, and the cascade heat exchanger are in fluid communication such that a first heat transfer fluid can flow therethrough, and a second heat transfer circuit, including a second compressor, the cascade heat exchanger, a second expansion device, and an evaporator, wherein the second compressor, the cascade heat exchanger, the second expansion device, and the evaporator are in fluid communication such that a second heat transfer fluid can flow therethrough. The method further includes disposing the first heat transfer circuit and the second heat transfer circuit in thermal communication at the cascade heat exchanger such that the first heat transfer fluid and the second heat transfer fluid are in a heat exchange relationship at the cascade heat exchanger.

BRIEF DESCRIPTION OF THE DRAWINGS

References are made to the accompanying drawings that form a part of this disclosure, and which illustrate embodiments in which the systems and methods described in this specification can be practiced.

Like reference numbers represent like parts throughout.

DETAILED DESCRIPTION

Figure 1:
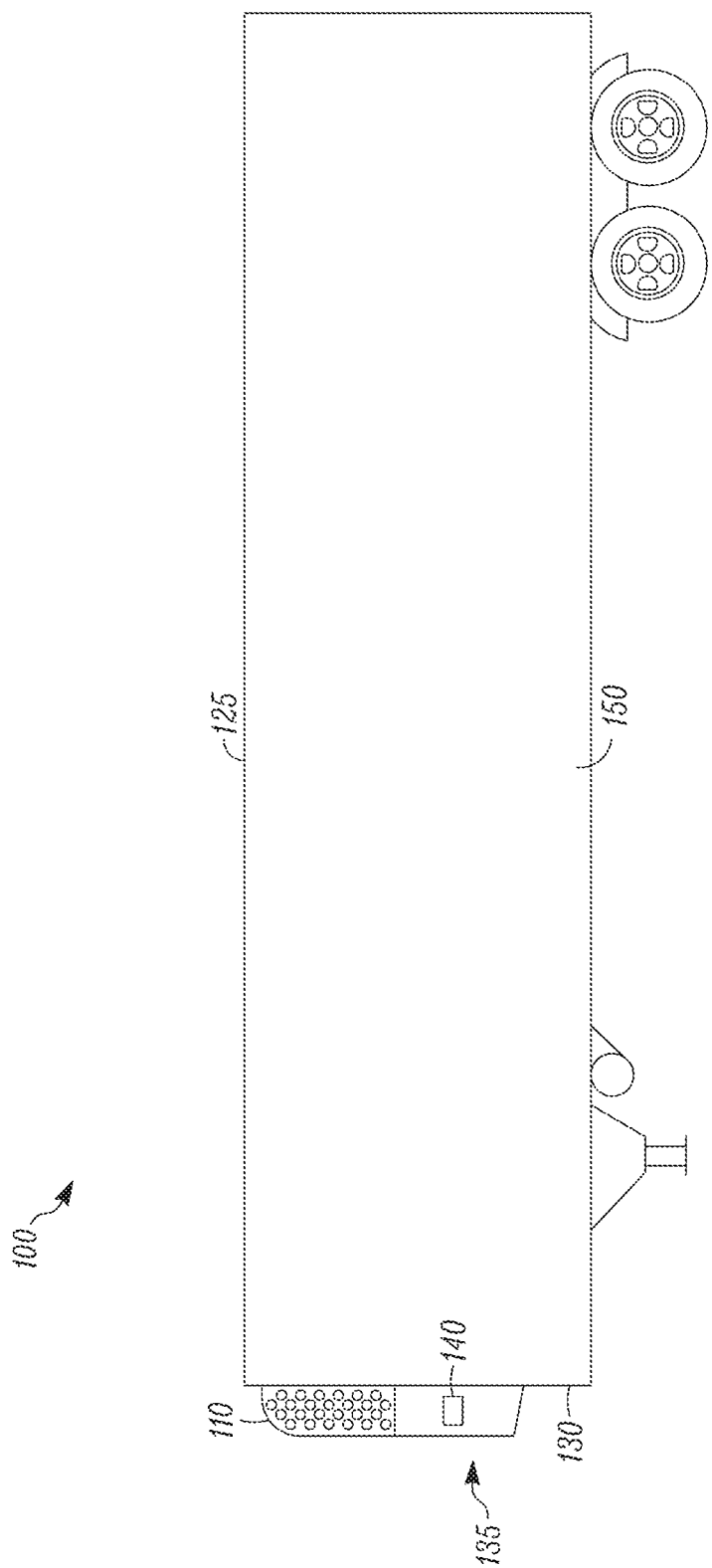
FIG. 1 illustrates a side view of a refrigerated transport unit, according to an embodiment.

This disclosure relates generally to a transport refrigeration system (TRS). More specifically, the disclosure relates to systems and methods for providing a cascade heat exchange between a plurality of heat transfer circuits in a TRS.

A TRS is generally used to control one or more environmental conditions such as, but not limited to, temperature, humidity, and/or air quality of a transport unit. Examples of transport units include, but are not limited to, a container (e.g., a container on a flat car, an intermodal container, etc.), a truck, a boxcar, or other similar transport units. A refrigerated transport unit (e.g., a transport unit including a TRS) can be used to transport perishable items such as, but not limited to, produce, frozen foods, and meat products.

As disclosed in this specification, a TRS can include a transport refrigeration unit (TRU) which is attached to a transport unit to control one or more environmental conditions (e.g., temperature, humidity, air quality, etc.) of an interior space of the refrigerated transport unit. The TRU can include, without limitation, a compressor, a condenser, an expansion valve, an evaporator, and one or more fans or blowers to control the heat exchange between the air within the interior space and the ambient air outside of the refrigerated transport unit.

A "transport unit" includes, for example, a container (e.g., a container on a flat car, an intermodal container, etc.), truck, a boxcar, or other similar transport unit.

A "transport refrigeration system" (TRS) includes, for example, a refrigeration system for controlling the refrigeration of an interior space of a refrigerated transport unit. The TRS may include a vapor-compressor type refrigeration system, a thermal accumulator type system, or any other suitable refrigeration system that can use refrigerant, cold plate technology, or the like.

A "refrigerated transport unit" includes, for example, a transport unit having a TRS.

Embodiments of this disclosure may be used in any suitable environmentally controlled transport apparatus, such as, but not limited to, a shipboard container, an air cargo cabin, and an over the road truck cabin.

Generally, a TRS may use hydrofluorocarbon (HFC) heat transfer fluids (commonly referred to as a "refrigerant"). For example, one commonly used HFC heat transfer fluid is R-404A (as identified according to its American Society of Heating, Refrigerating, and Air Conditioning Engineers ("ASHRAE") designation). The R-404A heat transfer fluid, however, has a relatively high global warming potential (GWP). The GWP of R-404A is 3,922 (on the 100 year GWP time horizon, according to the Intergovernmental Panel on Climate Change (IPCC Report 4)).

An increasing focus is being placed on replacing the HFC heat transfer fluids with relatively lower GWP alternatives. Examples of suitable alternatives include, but are not limited to, unsaturated HFCs such as hydrofluoroolefins (HFOs), hydrocarbons (HCs), ammonia, and carbon dioxide ($CO_2$, also known by its ASHRAE designation of R-744). Carbon dioxide, for example, has a GWP of 1. These alternatives have a variety of advantages and disadvantages such as, for example, safety risks (e.g., flammability, operating pressure, etc.), thermophysical properties (e.g., relating to efficiency of the TRS), cost, availability, or the like. In general, embodiments described herein can reduce global warming impact due to emissions of the heat transfer fluid into the environment, optimize efficiency of the TRS and reduce an amount of energy input to maintain a desired condition in a conditioned space, or the like.

FIG. 1 illustrates a side view of a TRS 100 for a transport unit 125, according to an embodiment. The illustrated transport unit 125 is a trailer-type transport unit. Embodiments as described in this specification can be used with other types of transport units. For example, the transport unit 125 can represent a container (e.g., a container on a flat car, an intermodal container, etc.), a truck, a boxcar, or other similar type of refrigerated transport unit including an environmentally controlled interior space.

The TRS 100 is configured to control one or more environmental conditions such as, but not limited to, temperature, humidity, and/or air quality of an interior space 150 of the transport unit 125. In an embodiment, the interior space 150 can alternatively be referred to as the conditioned space 150, the cargo space 150, the environmentally controlled space 150, or the like. In particular, the TRS 100 is configured to transfer heat between the air inside the interior space 150 and the ambient air outside of the transport unit 125.

The interior space 150 can include one or more partitions or internal walls (not shown) for at least partially dividing the interior space 150 into a plurality of zones or compartments, according to an embodiment. It is to be appreciated that the interior space 150 may be divided into any number of zones and in any configuration that is suitable for refrigeration of the different zones. In some examples, each of the zones can have a set point temperature that is the same or different from one another.

The TRS 100 includes a transport refrigeration unit (TRU) 110. The TRU 110 is provided on a front wall 130 of the transport unit 125. The TRU 110 can include a prime mover (e.g., an internal combustion engine) (not shown) that provides power to a component (e.g., a compressor, etc.) of the TRS 100.

The TRU 110 includes a programmable TRS Controller 135 that includes a single integrated control unit 140. It is to be appreciated that, in an embodiment, The TRS controller 135 may include a distributed network of TRS control elements (not shown). The number of distributed control elements in a given network can depend upon the particular application of the principles described in this specification. The TRS Controller 135 can include a processor, a memory, a clock, and an input/output (I/O) interface (not shown). The TRS Controller 135 can include fewer or additional components.

Figure 2:
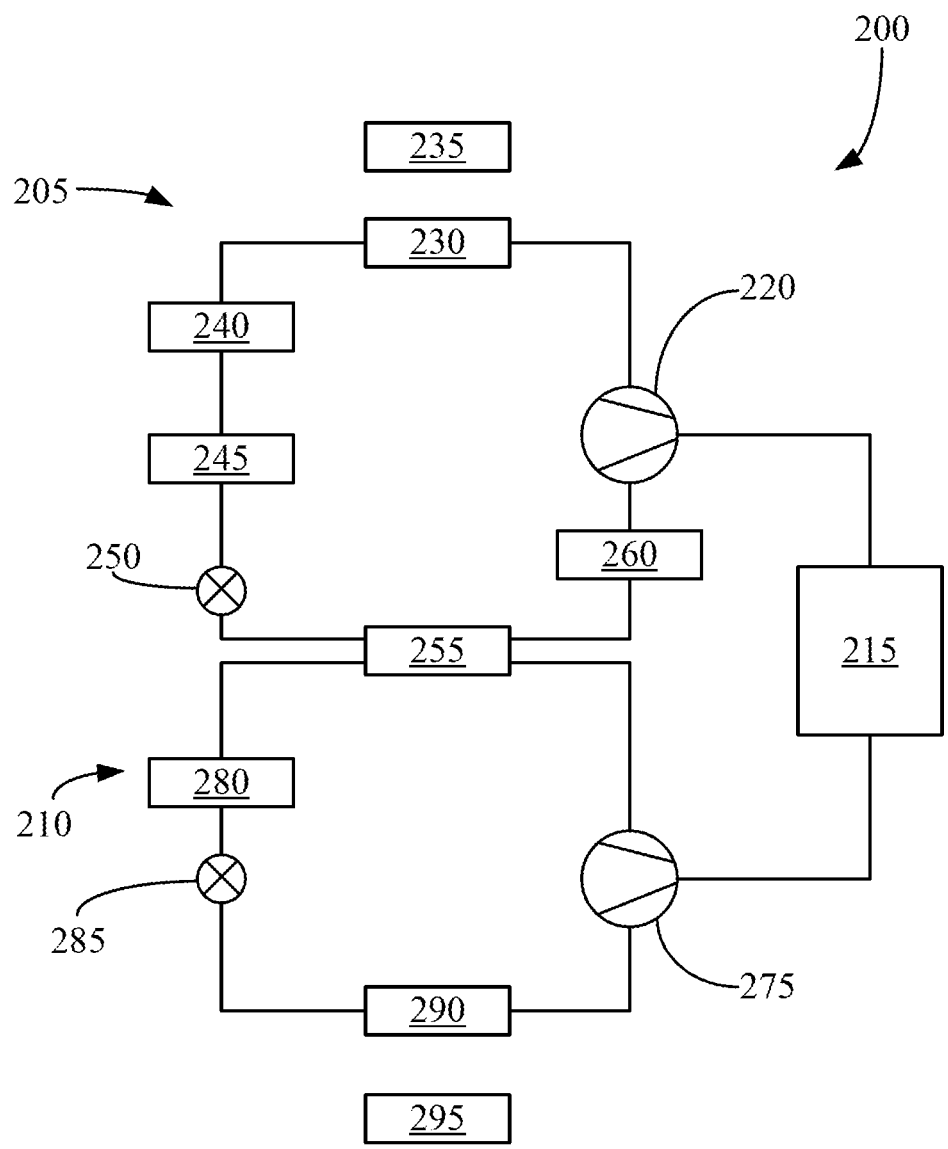
FIG. 2 is a schematic diagram of a heat transfer system for a transport refrigeration system, according to an embodiment.

The TRU 110 also includes a heat transfer circuit (as shown and described in FIG. 2). Generally, the TRS Controller 135 is configured to control a heat transfer cycle (e.g., controlling the heat transfer circuit of the TRU 110) of the TRS 100. In one example, the TRS Controller 135 controls the heat transfer cycle of the TRS 100 to obtain various operating conditions (e.g., temperature, humidity, air quality etc.) of the interior space 150.

FIG. 2 is a schematic diagram of a heat transfer system 200 for a TRS (e.g., the TRS 100 of FIG. 1), according to an embodiment. The heat transfer system 200 includes a first heat transfer circuit 205 and a second heat transfer circuit 210. In an embodiment, the first heat transfer circuit 205 can alternatively be referred to as the primary heat transfer circuit 205, the high side heat transfer circuit 205, the condensing side heat transfer circuit 205, the stage two heat transfer circuit, or the like. In an embodiment, the second heat transfer circuit 210 can alternatively be referred to as the low side heat transfer circuit 210, the evaporating side heat transfer circuit 210, or the like. The first heat transfer circuit 205 is in thermal communication with the second heat transfer circuit 210.

The first heat transfer circuit 205 includes a compressor 220, a condenser 230, a condenser fan 235, a first accumulator 240, a heat exchanger 245, an expansion device 250, a cascade heat exchanger 255, and a second accumulator 260. The compressor 220, condenser 230, first accumulator 240, heat exchanger 245, expansion device 250, cascade heat exchanger 255, and second accumulator 260 are fluidly connected to form the first heat transfer circuit 205 in which a heat transfer fluid can circulate therethrough. The heat transfer fluid can generally be a heat transfer fluid having a relatively low global warming potential (GWP). Examples of suitable heat transfer fluids for the first heat transfer circuit 205 can include, but are not limited to, hydrofluoroolefins (HFOs), hydrocarbons (HCs), and carbon dioxide ($CO_2$) (also known by its ASHRAE Standard 34 designation R-744), or the like.

In the illustrated embodiment, the compressor 220 is driven by a power source 215. The power source 215 can be, for example, a part of the TRU 110 (FIG. 1). The power source 215 (e.g., an internal combustion engine, an electric drive motor, etc.) can provide mechanical power directly to the compressor 220. The power source 215 can also provide mechanical power directly to a generator (e.g., an alternator, etc.), which can be used to provide power either to the compressor 220 or a second compressor 275 of the second heat transfer circuit 210. In such an embodiment, the power source 215 may include a converter between the generator and the second compressor 275 to provide an appropriate power source for the second compressor 275. In an embodiment in which the power source 215 includes an electric drive motor that provides mechanical power directly to the compressor 220 and/or the second compressor 275, the electric power can come from any of a variety of sources (e.g., batteries, shore power, etc.).

The second heat transfer circuit 210 includes the second compressor 275, the cascade heat exchanger 255, a third accumulator 280, a second expansion device 285, an evaporator 290, and an evaporator fan 295. The second compressor 275, cascade heat exchanger 255, third accumulator 280, second expansion device 285, and evaporator 290 are fluidly connected to form the second heat transfer circuit 210 in which a heat transfer fluid can circulate therethrough. The heat transfer fluid in the second heat transfer circuit 210 can generally be different from the heat transfer fluid in the first heat transfer circuit 205. The heat transfer fluid in the second heat transfer circuit 210 can be, for example, R-744 ($CO_2$). The heat transfer fluid in the second heat transfer circuit 210 can be selected, for example, based on its performance at relatively low temperatures.

In operation, the heat transfer system 200 can be used to maintain a desired condition in the interior space 150 of the transport unit 125. More particularly, the first heat transfer circuit 205 may receive heat that is rejected from the second heat transfer circuit 210 via the cascade heat exchanger 255. The second heat transfer circuit 210 can in turn be used to maintain the desired condition within the interior space 150.

The first heat transfer circuit 205 can function according to generally known principles in order to remove heat from the second heat transfer circuit 210. The compressor 220 compresses the heat transfer fluid from a relatively lower pressure gas to a relatively higher-pressure gas. The relatively higher-pressure gas is discharged from the compressor 220 and flows through the condenser 230. In accordance with generally known principles, the heat transfer fluid flows through the condenser 230 and rejects heat to a heat transfer fluid or medium (e.g., air, etc.), thereby cooling the heat transfer fluid or medium. The condenser fan 235, in accordance with generally known principles, can aid in removing the heat from the heat transfer fluid in the first heat transfer circuit 205. The cooled heat transfer medium which is now in a liquid form flows through the heat exchanger 245 where the heat transfer fluid is further sub-cooled prior to entering the expansion device 250. The heat exchanger 245 may alternatively be referred to as the suction-to-liquid line heat exchanger 245. The heat exchanger 245 can further sub-cool the heat transfer fluid which can, in an embodiment, increase a capacity of the first heat transfer circuit 205. The heat transfer fluid, in a mixed liquid and gaseous form, flows to the cascade heat exchanger 255.

At the cascade heat exchanger 255, the heat transfer medium in the first heat transfer circuit 205 absorbs heat from the heat transfer medium of the second heat transfer circuit 210, heating the heat transfer fluid and converting it to a gaseous form. The gaseous heat transfer fluid then flows through the second accumulator 260 and returns to the compressor 220. The above-described process can continue while the heat transfer circuit 205 is operating (e.g., when the prime mover 215 is operating). In an embodiment, the cascade heat exchanger 255 and the heat exchange relationship between the first heat transfer circuit 205 and the second heat transfer circuit 210 can increase an efficiency of the refrigeration system by, for example, reducing an amount of energy input via the power source 215 to maintain the one or more desired conditions inside the transport unit 125 (FIG. 1). In an embodiment, the reduction in energy input can, for example, reduce an impact on the environment. In an embodiment, the cascade heat exchanger 255 can reduce use of high pressure refrigeration components (e.g., by enabling use of lower pressure heat transfer fluids).

The second heat transfer circuit 210 can function according to generally known principles in order to reject heat to the first heat transfer circuit 205. The second compressor 275 compresses the heat transfer fluid from a relatively lower pressure gas to a relatively higher-pressure gas. The relatively higher-pressure gas is discharged from the second compressor 275 and flows through the cascade heat exchanger 255. In accordance with generally known principles, the heat transfer fluid can be in a heat exchange relationship with the heat transfer fluid of the first heat transfer circuit 205 condenser 230 and can reject heat to the heat transfer fluid of the first heat transfer circuit 205, thereby cooling the heat transfer fluid of the second heat transfer circuit 210. The cooled heat transfer medium which is now in a liquid form can flow through the third accumulator 280 to the second expansion device 285. As a result, a portion of the heat transfer fluid is converted to a gaseous form. The heat transfer fluid, which is now in a mixed liquid and gaseous form, can flow to the evaporator 290. At the evaporator 290, the heat transfer medium in the second heat transfer circuit 210 can absorb heat from a heat transfer medium (e.g., air), heating the heat transfer fluid and converting it to a gaseous form. The evaporator fan 295, in accordance with generally known principles, can aid in absorbing the heat from the heat transfer fluid in the second heat transfer circuit 210. The evaporator fan 295 can also, for example, blow air into the conditioned space 150 in order to maintain the desired condition. The gaseous heat transfer fluid can then return to the compressor 220. The above-described process can continue while the heat transfer circuit 210 is operating.

Figure 3A:
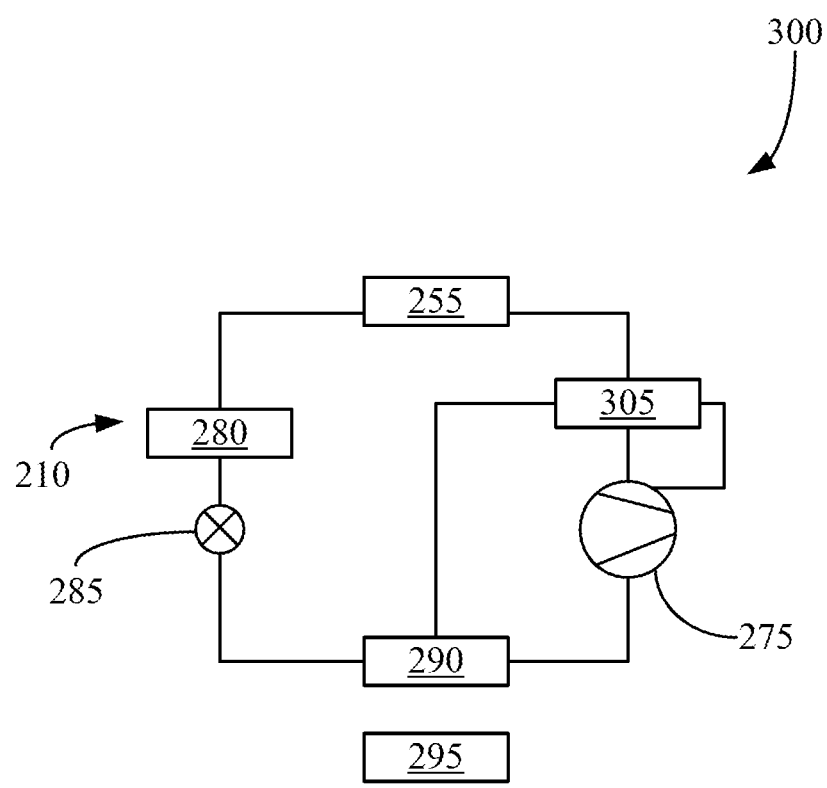
FIG. 3A is a schematic diagram of a reverse cycle heating/defrost circuit for the heat transfer system of FIG. 2 for a transport refrigeration system, according to an embodiment.

FIG. 3A is a schematic diagram of a heat transfer circuit 300 which can be included in place of the heat transfer circuit 210 (FIG. 2) in the heat transfer system 200 (FIG. 2), according to an embodiment. The heat transfer circuit 300 additionally includes a flow control device 305. The flow control device 305 can be, for example, a four-way valve, or the like. In operation, the flow control device 305 can be used to modify the flow of the heat transfer fluid in the heat transfer circuit 300. This can, for example, enable the heat transfer circuit to be used in a cooling mode (e.g., the second heat transfer circuit 210 as described in accordance with FIG. 2 above) or in a heating mode, in which the flow of the heat transfer fluid is reversed in order to reject heat to the conditioned space 150 (FIG. 1) instead of rejecting heat from the conditioned space 150.

Figure 3B:
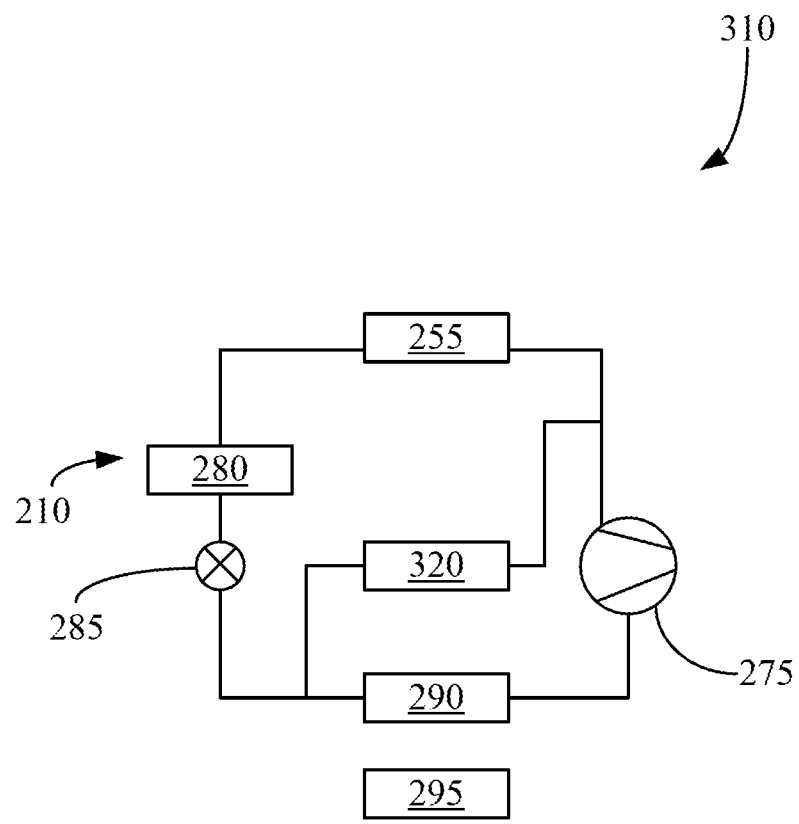
FIG. 3B is a schematic diagram of a hot gas bypass heating/defrost circuit for the heat transfer system of FIG. 2 for a transport refrigeration system, according to an embodiment.

FIG. 3B is a schematic diagram of a heat transfer circuit 310 which can be included in place of the heat transfer circuit 210 (FIG. 2) in the heat transfer system 200 (FIG. 2), according to an embodiment. The heat transfer circuit 310 additionally includes a hot-gas bypass flow 315 and a flow control device 320. The hot-gas bypass flow 315 can be used, for example, to divert a portion of heat transfer fluid to defrost the evaporator 290. The flow control device 320 can be, for example, a solenoid valve (or similar type of valve) which either enables or disables flow of the heat transfer fluid. In an embodiment, the flow control device 320 can have one or more intermediate positions in which flow of the heat transfer fluid therethrough is partially enabled.

Figure 4A:
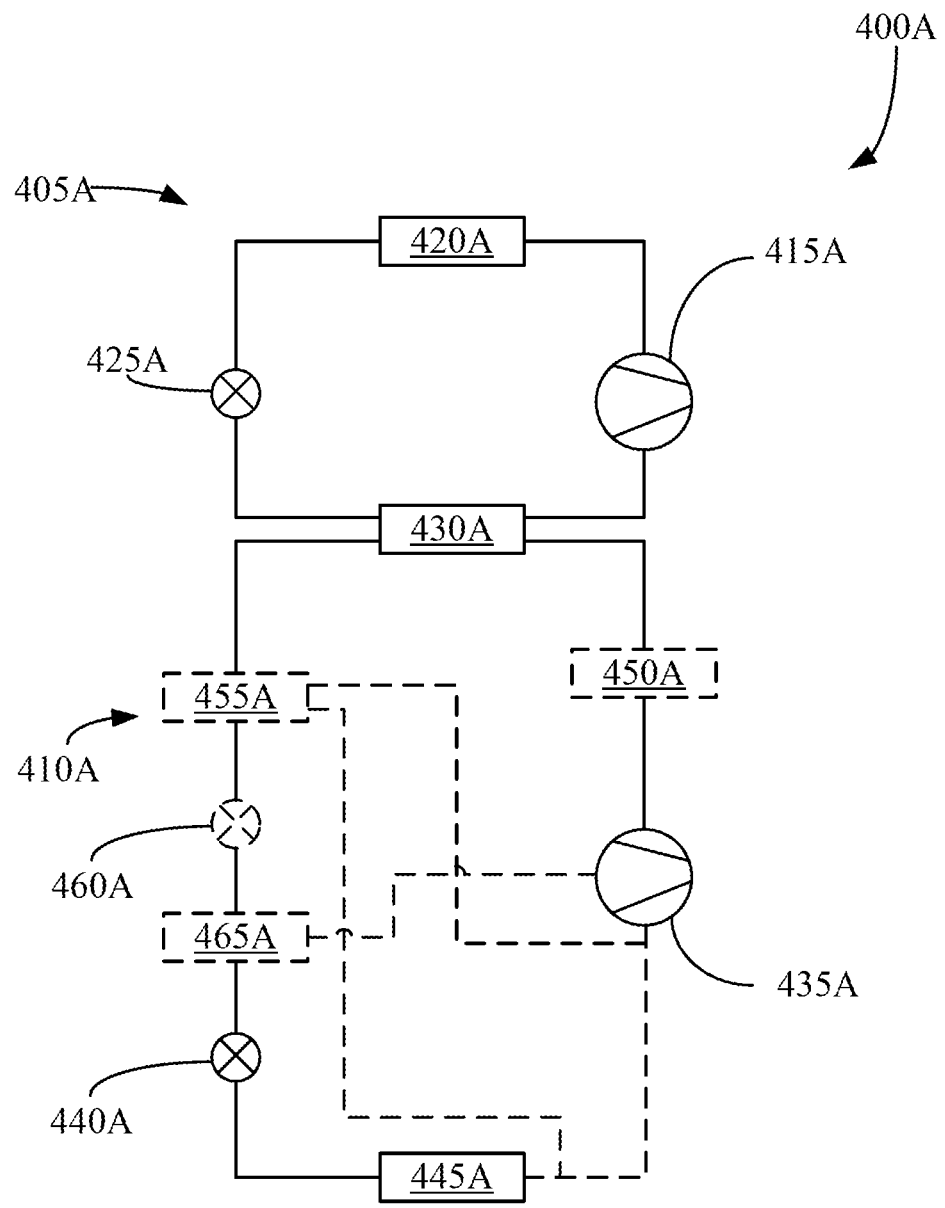
FIG. 4A is a schematic diagram of a heat transfer system for a transport refrigeration system, according to an embodiment.

FIG. 4A is a schematic diagram of a heat transfer system 400A for a TRS (e.g., the TRS 100 of FIG. 1), according to an embodiment. The heat transfer system 400A includes a first heat transfer circuit 405A and a second heat transfer circuit 410A. In an embodiment, the first heat transfer circuit 405A can alternatively be referred to as the primary heat transfer circuit 405A, the high side heat transfer circuit 405A, the condensing side heat transfer circuit 405A, the stage two heat transfer circuit 405A, or the like. In an embodiment, the second heat transfer circuit 410A can alternatively be referred to as the low side heat transfer circuit 410A, the evaporating side heat transfer circuit 410A, or the like. The first heat transfer circuit 405A is in thermal communication with the second heat transfer circuit 410A. Aspects of the heat transfer circuit 410A may be optional, as illustrated in dashed lines in the figure.

Aspects of the heat transfer system 400A may be the same as or similar to aspects of the heat transfer system 200 of FIG. 2.

The first heat transfer circuit 405A includes a compressor 415A, a condenser 420A, an expansion device 425A, and a cascade heat exchanger 430A. It will be appreciated that the first heat transfer circuit 405A can include one or more additional components. For example, the first heat transfer circuit 405A can include one or more of the components shown and described in accordance with FIG. 4B below.

The compressor 415A, condenser 420A, expansion device 425A, and cascade heat exchanger 430A are fluidly connected to form the first heat transfer circuit 405A in which a heat transfer fluid can circulate therethrough. The heat transfer fluid can generally be a heat transfer fluid having a relatively low global warming potential (GWP). Examples of suitable heat transfer fluids for the first heat transfer circuit 405A can include, but are not limited to, hydrofluoroolefins (HFOs), hydrocarbons (HCs), and carbon dioxide ($CO_2$) (also known by its ASHRAE Standard 34 designation R-744), or the like.

The second heat transfer circuit 410A includes a compressor 435A, an expansion device 440A, and an evaporator 445A. The compressor 435A, cascade heat exchanger 430A, expansion device 440A, and evaporator 445A are fluidly connected to form the second heat transfer circuit 410A in which a heat transfer fluid can circulate therethrough. The heat transfer fluid can generally be a heat transfer fluid having a relatively low global warming potential (GWP). Examples of suitable heat transfer fluids for the second heat transfer circuit 410A can include, but are not limited to, hydrofluoroolefins (HFOs), hydrocarbons (HCs), and carbon dioxide ($CO_2$) (also known by its ASHRAE Standard 34 designation R-744), or the like. In an embodiment, the heat transfer fluid in the first heat transfer circuit 405A and the heat transfer fluid for the second heat transfer circuit 410A can be the same. In an embodiment, the heat transfer fluid in the first heat transfer circuit 405A and the heat transfer fluid for the second heat transfer circuit 410A can be different.

The second heat transfer circuit 410A can include one or more additional components. For example, in an embodiment, the second heat transfer circuit 410A includes one or more of an intercooler 450A, a suction-liquid heat exchanger 455A, an expansion device 460A, and an economizer 465A. In an embodiment, the economizer 465A can include an economizer heat exchanger. In an embodiment, the economizer 465A can include a flash tank economizer.

In an embodiment, a location of the suction-liquid heat exchanger 455A and the economizer 465A can be switched. That is, in the illustrated embodiment, the suction-liquid heat exchanger 455A is disposed between the economizer 465A and the cascade heat exchanger 430A. In an embodiment, the economizer 465A can be disposed between the suction-liquid heat exchanger 455A and the cascade heat exchanger 430A. In an embodiment, the one or more additional components can, for example, increase an efficiency of the heat transfer system 400A. In an embodiment, the one or more additional components can, for example, reduce a size of the cascade heat exchanger 430A.

The compressors 415A and 435A can be driven by a power source (e.g., the power source 215 in FIG. 2) (not shown in FIG. 4A).

In operation, the heat transfer system 400A can be used to maintain a desired condition in the interior space 150 of the transport unit 125. More particularly, the first heat transfer circuit 405A may receive heat that is rejected from the second heat transfer circuit 410A via the cascade heat exchanger 430A. The second heat transfer circuit 410A can in turn be used to maintain the desired condition within the interior space 150.

Figure 4B:
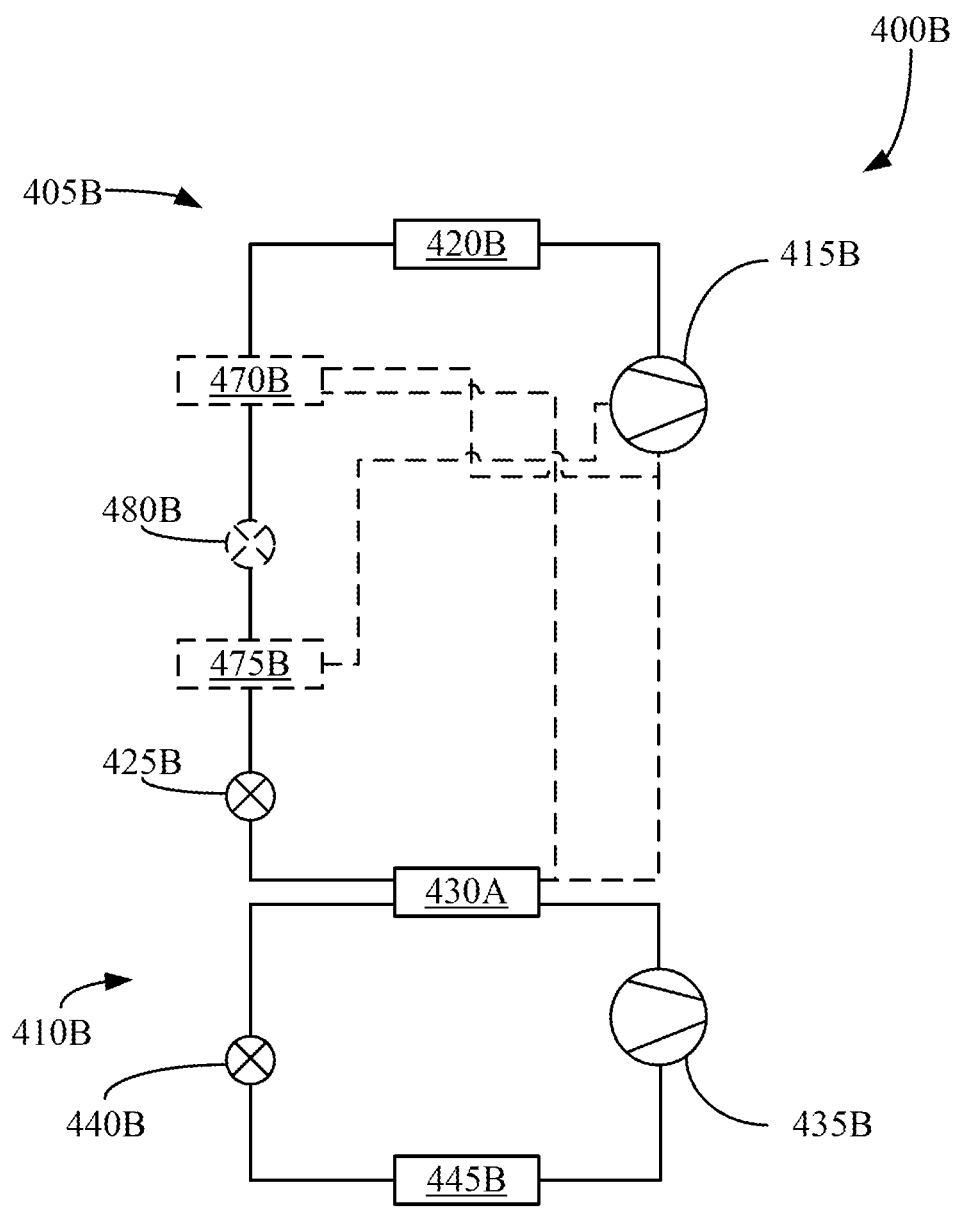
FIG. 4B is a schematic diagram of a heat transfer system for a transport refrigeration system, according to an embodiment.

FIG. 4B is a schematic diagram of a heat transfer system 400B for a TRS (e.g., the TRS 100 of FIG. 1), according to an embodiment. The heat transfer system 400B includes a first heat transfer circuit 405B and a second heat transfer circuit 410B. In an embodiment, the first heat transfer circuit 405B can alternatively be referred to as the primary heat transfer circuit 405B, the high side heat transfer circuit 405B, the condensing side heat transfer circuit 405B, the stage two heat transfer circuit 405B, or the like. In an embodiment, the second heat transfer circuit 410B can alternatively be referred to as the low side heat transfer circuit 410B, the evaporating side heat transfer circuit 410B, or the like. The first heat transfer circuit 405B is in thermal communication with the second heat transfer circuit 410B. Aspects of the heat transfer circuit 405B may be optional, as illustrated in dashed lines in the figure.

Aspects of the heat transfer system 400B may be the same as or similar to aspects of the heat transfer system 200 of FIG. 2.

The first heat transfer circuit 405B includes a compressor 415B, a condenser 420B, an expansion device 425B, and a cascade heat exchanger 430B.

The compressor 415B, condenser 420B, expansion device 425B, and cascade heat exchanger 430B are fluidly connected to form the first heat transfer circuit 405B in which a heat transfer fluid can circulate therethrough. The heat transfer fluid can generally be a heat transfer fluid having a relatively low global warming potential (GWP). Examples of suitable heat transfer fluids for the first heat transfer circuit 405B can include, but are not limited to, hydrofluoroolefins (HFOs), hydrocarbons (HCs), and carbon dioxide ($CO_2$) (also known by its ASHRAE Standard 34 designation R-744), or the like.

The first heat transfer circuit 405B can include one or more additional components. For example, in an embodiment, the first heat transfer circuit 405B includes one or more of a suction-liquid heat exchanger 470B, an economizer 475B, and an expansion device 480B. In an embodiment, the economizer 475B can include an economizer heat exchanger. In an embodiment, the economizer 475B can include a flash tank economizer. In an embodiment, the one or more additional components can, for example, increase an efficiency of the first heat transfer circuit 405B, and accordingly, the heat transfer system 400B.

The second heat transfer circuit 410B includes a compressor 435B, an expansion device 440B, and an evaporator 445B. It will be appreciated that the second heat transfer circuit 410B can include one or more additional components. For example, the second heat transfer circuit 410B can include one or more of the components shown and described in accordance with FIG. 4A above.

The compressor 435B, cascade heat exchanger 430B, expansion device 440B, and evaporator 445B are fluidly connected to form the second heat transfer circuit 410B in which a heat transfer fluid can circulate therethrough. The heat transfer fluid can generally be a heat transfer fluid having a relatively low global warming potential (GWP). Examples of suitable heat transfer fluids for the second heat transfer circuit 410B can include, but are not limited to, hydrofluoroolefins (HFOs), hydrocarbons (HCs), and carbon dioxide ($CO_2$) (also known by its ASHRAE Standard 34 designation R-744), or the like. In an embodiment, the heat transfer fluid in the first heat transfer circuit 405B and the heat transfer fluid for the second heat transfer circuit 410B can be the same. In an embodiment, the heat transfer fluid in the first heat transfer circuit 405B and the heat transfer fluid for the second heat transfer circuit 410B can be different.

The compressors 415B, 435B can be driven by a power source (e.g., the power source 215 in FIG. 2) (not shown in FIG. 4B).

In operation, the heat transfer system 400B can be used to maintain a desired condition in the interior space 150 of the transport unit 125. More particularly, the first heat transfer circuit 405B may receive heat that is rejected from the second heat transfer circuit 410B via the cascade heat exchanger 430B. The second heat transfer circuit 410B can in turn be used to maintain the desired condition within the interior space 150.

It is to be appreciated that aspects of FIGS. 4A and 4B can be combined. For example, a heat transfer system can include the first heat transfer circuit 405A and the second heat transfer circuit 410B. In an embodiment, a heat transfer system can include the first heat transfer circuit 405B and the second heat transfer circuit 410A.

Aspects:

It is noted that any one of aspects 1-12 below can be combined with any one of aspects 13-23, 24-26, and/or 27-28. Any one of aspects 13-23 can be combined with any one of aspects 24-26 and/or 27-28. Any one of aspects 24-26 can be combined with any one of aspects 27-28.

Aspect 1. A transport refrigeration system (TRS), comprising:
a first heat transfer circuit, including:
a first compressor, a condenser, a first expansion device, and a cascade heat exchanger, wherein the first compressor, the condenser, the first expansion device, and the cascade heat exchanger are in fluid communication such that a first heat transfer fluid can flow therethrough; and
a second heat transfer circuit, including:
a second compressor, the cascade heat exchanger, a second expansion device, and an evaporator, wherein the second compressor, the cascade heat exchanger, the second expansion device, and the evaporator are in fluid communication such that a second heat transfer fluid can flow therethrough;
wherein the first heat transfer circuit and the second heat transfer circuit are arranged in thermal communication at the cascade heat exchanger such that the first heat transfer fluid and the second heat transfer fluid are in a heat exchange relationship at the cascade heat exchanger.

Aspect 2. The TRS according to aspect 1, further comprising a prime mover configured to provide mechanical power to the first compressor.

Aspect 3. The TRS according to aspect 2, further comprising a generator connected to the prime mover such that the prime mover provides mechanical power to the generator, wherein the generator is electrically connected to the second compressor to provide an electric power to the second compressor.

Aspect 4. The TRS according to any one of aspects 1-3, wherein the first heat transfer fluid and the second heat transfer fluid are different.

Aspect 5. The TRS according to any one of aspects 1-4, wherein the first heat transfer fluid has a relatively low global warming potential (GWP).

Aspect 6. The TRS according to aspect 5, wherein the first heat transfer fluid is an unsaturated hydrofluorocarbon (HFC).

Aspect 7. The TRS according to aspect 6, wherein the first heat transfer fluid is one of a hydrofluoroolefin (HFO), a hydrocarbon (HC), ammonia, or carbon dioxide ($CO_2$).

Aspect 8. The TRS according to any one of aspects 1-7, wherein the second heat transfer fluid is carbon dioxide ($CO_2$).

Aspect 9. The TRS according to any one of aspects 1-8, wherein the second heat transfer circuit further includes a four-way flow control device.

Aspect 10. The TRS according to any one of aspects 1-9, wherein the second heat transfer circuit further includes a hot-gas bypass.

Aspect 11. The TRS according to any one of aspects 1-10, wherein the second heat transfer circuit further includes one or more of an intercooler, a suction-liquid heat exchanger, and an economizer.

Aspect 12. The TRS according to any one of aspects 1-11, wherein the first heat transfer circuit further includes one or more of a suction-liquid heat exchanger and an economizer.

Aspect 13. A system, comprising:
an internal combustion engine;
a first heat transfer circuit, including:
a first compressor, a condenser, a first expansion device, and a cascade heat exchanger, wherein the first compressor, the condenser, the first expansion device, and the cascade heat exchanger are in fluid communication such that a first heat transfer fluid can flow therethrough; and
a second heat transfer circuit, including:
a second compressor, the cascade heat exchanger, a second expansion device, and an evaporator, wherein the second compressor, the cascade heat exchanger, the second expansion device, and the evaporator are in fluid communication such that a second heat transfer fluid can flow therethrough;

wherein the first heat transfer circuit and the second heat transfer circuit are arranged in thermal communication at the cascade heat exchanger such that the first heat transfer fluid and the second heat transfer fluid are in a heat exchange relationship at the cascade heat exchanger.

Aspect 14. The system according to aspect 13, further comprising a generator coupled to the internal combustion engine, wherein the generator is configured to provide an electrical power to the second compressor.

Aspect 15. The system according to any one of aspects 13-14, wherein the first heat transfer fluid and the second heat transfer fluid are different.

Aspect 16. The system according to any one of aspects 13-15, wherein the first heat transfer fluid has a relatively low global warming potential (GWP).

Aspect 17. The system according to aspect 16, wherein the first heat transfer fluid is an unsaturated hydrofluorocarbon (HFC).

Aspect 18. The system according to aspect 17, wherein the first heat transfer fluid is one of a hydrofluoroolefin (HFO), a hydrocarbon (HC), ammonia, or carbon dioxide ($CO_2$).

Aspect 19. The system according to any one of aspects 13-18, wherein the second heat transfer fluid is carbon dioxide ($CO_2$).

Aspect 20. The system according to any one of aspects 13-19, wherein the second heat transfer circuit further includes a four-way flow control device.

Aspect 21. The system according to any one of aspects 13-20, wherein the second heat transfer circuit further includes a hot-gas bypass.

Aspect 22. The system according to any one of aspects 13-21, wherein the second heat transfer circuit further includes one or more of an intercooler, a suction-liquid heat exchanger, and an economizer.

Aspect 23. The system according to any one of aspects 13-22, wherein the first heat transfer circuit further includes one or more of a suction-liquid heat exchanger and an economizer.

Aspect 24. A method of heat transfer in a transport refrigeration system (TRS), the TRS having a first heat transfer circuit and a second heat transfer circuit in thermal communication via a cascade heat exchanger, the method comprising:

circulating a first heat transfer fluid through the first heat transfer circuit;

circulating a second heat transfer fluid through the second heat transfer circuit; and exchanging heat between the first heat transfer fluid and the second heat transfer fluid via the cascade heat exchanger.

Aspect 25. The method according to aspect 24, wherein exchanging heat between the first heat transfer fluid and the second heat transfer fluid via the cascade heat exchanger includes rejecting heat from the second heat transfer fluid to the first heat transfer fluid.

Aspect 26. The method according to aspect 25, wherein the second heat transfer circuit is in thermal communication with a conditioned space of the TRS, and the method further includes controlling one or more environmental conditions in the conditioned space with the second heat transfer circuit.

Aspect 27. A transport refrigeration system (TRS), comprising:

a first heat transfer circuit, including:
a first compressor, a condenser, a first expansion device, an economizer, a second expansion device, and a cascade heat exchanger, wherein the first compressor, the condenser, the first expansion device, the economizer, the second expansion device, and the cascade heat exchanger are in fluid communication such that a first heat transfer fluid can flow therethrough; and a second heat transfer circuit, including:
a second compressor, an intercooler, the cascade heat exchanger, a suction-liquid heat exchanger, a third expansion device, and an evaporator, wherein the second compressor, the intercooler, the cascade heat exchanger, the suction-liquid heat exchanger, the third expansion device, and the evaporator are in fluid communication such that a second heat transfer fluid can flow therethrough;

wherein the first heat transfer circuit and the second heat transfer circuit are arranged in thermal communication at the cascade heat exchanger such that the first heat transfer fluid and the second heat transfer fluid are in a heat exchange relationship at the cascade heat exchanger.

Aspect 28. The TRS according to aspect 27, wherein the economizer is one of an economizer heat exchanger and a flash tank economizer.

The terminology used in this specification is intended to describe particular embodiments and is not intended to be limiting. The terms "a," "an," and "the" include the plural forms as well, unless clearly indicated otherwise. The terms "comprises" and/or "comprising," when used in this specification, specify the presence of the stated features, integers, steps, operations, elements, and/or components, but do not preclude the presence or addition of one or more other features, integers, steps, operations, elements, and/or components.

With regard to the preceding description, it is to be understood that changes may be made in detail, especially in matters of the construction materials employed and the shape, size, and arrangement of parts without departing from the scope of the present disclosure. This specification and the embodiments described are exemplary only, with the true scope and spirit of the disclosure being indicated by the claims that follow.

The invention claimed is:

1. A transport refrigeration system (TRS), comprising:
a first heat transfer circuit, including:
a first compressor, a condenser, a first expansion device, and a cascade heat exchanger, wherein the first compressor, the condenser, the first expansion device, and the cascade heat exchanger are in fluid communication such that a first heat transfer fluid can flow sequentially therethrough; and a second heat transfer circuit, including:
a second compressor, the cascade heat exchanger, a second expansion device, and an evaporator, wherein the second compressor, the cascade heat exchanger, the second expansion device, and the evaporator are in fluid communication such that a second heat transfer fluid can flow sequentially therethrough;

wherein the first heat transfer circuit and the second heat transfer circuit are arranged in thermal communication at the cascade heat exchanger such that the first heat transfer fluid and the second heat transfer fluid are in a heat exchange relationship at the cascade heat exchanger, and the evaporator of the second heat transfer circuit is in thermal communication with a conditioned space of the TRS.

2. The TRS according to claim 1, further comprising a prime mover configured to provide mechanical power to the first compressor.

3. The TRS according to claim 2, further comprising a generator connected to the prime mover such that the prime mover provides mechanical power to the generator, wherein the generator is electrically connected to the second compressor to provide an electric power to the second compressor.

4. The TRS according to claim 1, wherein the first heat transfer fluid and the second heat transfer fluid are different.

5. The TRS according to claim 1, wherein the first heat transfer fluid has a relatively low global warming potential (GWP).

6. The TRS according to claim 5, wherein the first heat transfer fluid is one of an unsaturated hydrofluorocarbon (HFC), a hydrofluoroolefin (HFO), a hydrocarbon (HC), ammonia, or carbon dioxide ($CO_2$).

7. The TRS according to claim 1, wherein the second heat transfer fluid is carbon dioxide ($CO_2$).

8. The TRS according to claim 1, wherein the second heat transfer circuit further includes one or more of a four-way flow control device, a hot-gas bypass, an intercooler, a suction-liquid heat exchanger, and an economizer.

9. The TRS according to claim 1, wherein the first heat transfer circuit includes one or more of a suction-liquid heat exchanger and an economizer.

10. A system, comprising:
   an internal combustion engine;
   a first heat transfer circuit, including:
      a first compressor, a condenser, a first expansion device, and a cascade heat exchanger, wherein the first compressor, the condenser, the first expansion device, and the cascade heat exchanger are in fluid communication such that a first heat transfer fluid can flow sequentially therethrough; and
   a second heat transfer circuit, including:
      a second compressor, the cascade heat exchanger, a second expansion device, and an evaporator, wherein the second compressor, the cascade heat exchanger, the second expansion device, and the evaporator are in fluid communication such that a second heat transfer fluid can flow sequentially therethrough;
   wherein the first heat transfer circuit and the second heat transfer circuit are arranged in thermal communication at the cascade heat exchanger such that the first heat transfer fluid and the second heat transfer fluid are in a heat exchange relationship at the cascade heat exchanger,
   and the evaporator of the second heat transfer circuit is in thermal communication with a conditioned space.

11. The system according to claim 10, further comprising a generator coupled to the internal combustion engine, wherein the generator is configured to provide an electrical power to the second compressor.

12. The system according to claim 10, wherein the first heat transfer fluid and the second heat transfer fluid are different.

13. The system according to claim 10, wherein the first heat transfer fluid has a relatively low global warming potential (GWP).

14. The system according to claim 13, wherein the first heat transfer fluid is one of an unsaturated hydrofluorocarbon (HFC), a hydrofluoroolefin (HFO), a hydrocarbon (HC), ammonia, or carbon dioxide ($CO_2$).

15. The system according to claim 10, wherein the second heat transfer fluid is carbon dioxide ($CO_2$).

16. The system according to claim 10, wherein the second heat transfer circuit further includes one or more of a four-way flow control device, a hot-gas bypass, an intercooler, a suction-liquid heat exchanger, and an economizer.

17. The system according to claim 10, wherein the first heat transfer circuit further includes one or more of a suction-liquid heat exchanger and an economizer.

18. A method of heat transfer in a transport refrigeration system (TRS), the TRS having a first heat transfer circuit and a second heat transfer circuit in thermal communication via a cascade heat exchanger, the method comprising:
   circulating a first heat transfer fluid through the first heat transfer circuit, the first heat transfer circuit including a first compressor, a condenser, a first expansion device, and the cascade heat exchanger in fluid communication such that a first heat transfer fluid can flow sequentially therethrough;
   circulating a second heat transfer fluid through the second heat transfer circuit, the second heat transfer circuit including a second compressor, the cascade heat exchanger, a second expansion device, and an evaporator in fluid communication such that a second heat transfer fluid can flow sequentially therethrough;
   exchanging heat between the first heat transfer fluid and the second heat transfer fluid via the cascade heat exchanger; and
   exchanging heat between the evaporator in the second heat transfer circuit and a conditioned space.

19. The method according to claim 18, wherein exchanging heat between the first heat transfer fluid and the second heat transfer fluid via the cascade heat exchanger includes rejecting heat from the second heat transfer fluid to the first heat transfer fluid.

20. The TRS according to claim 1, wherein the first heat transfer circuit receives heat rejected from the second heat transfer circuit via the cascade heat exchanger.

* * * * *